United States Patent [19]

Blish

[11] Patent Number: 6,022,156

[45] Date of Patent: Feb. 8, 2000

[54] ERGONOMIC KEYBOARD

[76] Inventor: Nelson A. Blish, 302 Cove Creek, Houston, Tex. 77042

[21] Appl. No.: 08/164,854

[22] Filed: Dec. 10, 1993

[51] Int. Cl.⁷ ......................................................... B41J 5/08
[52] U.S. Cl. ............................................ 400/472; 400/715
[58] Field of Search ..................................... 400/472, 489, 400/485, 486, 487, 492, 491.3, 715; 341/21, 22, 27; 434/230–233

[56] References Cited

U.S. PATENT DOCUMENTS

| 3,093,911 | 6/1963 | Hagelstein et al. | 434/231 |
| 4,378,553 | 3/1983 | McCall | 341/21 |
| 4,522,518 | 6/1985 | Schmidt | 400/489 |
| 4,661,005 | 4/1987 | Lahr | 400/472 |
| 5,122,786 | 6/1992 | Rader | 400/492 |
| 5,212,473 | 5/1993 | Louis | 341/27 |

FOREIGN PATENT DOCUMENTS

| 9200851 | 1/1992 | European Pat. Off. | 400/472 |
| 0491589 | 9/1918 | France | 400/489 |
| 0331043 | 4/1919 | Germany | 400/491.3 |
| 0065573 | 11/1969 | Germany | 400/489 |

OTHER PUBLICATIONS

"Keyboard for Handheld Computer" IBM Technical Disclosure Bulletin, vol. 27, No. 10A, Mar. 85, p. 5643–45.

*Primary Examiner*—Edgar Burr
*Assistant Examiner*—Anthony H. Nguyen

[57] ABSTRACT

A two piece computer keyboard (10). A right hand keyboard (20) contains alphabetic keys normally operated by the right hand of the computer operator. Left hand keyboard (30) contains keys normally operated by the left hand of the operator. Right keyboard (20) and left keyboard (30) are electrically connected by cord (60). The size of keyboards (20) and (30) have been reduced by using keys which allow some alphabetic keys to be used in a multi-function fashion. Num key (40) allows use of alphabetic keys as numbers. Arrow key (50) allows use of alphabetic keys as arrows. Function keys (46) allows use of alphabetic keys as function keys F1, F2, etc. Special function key (48) allows use of some alphabetic keys as print screen, scroll lock, etc.

1 Claim, 3 Drawing Sheets

ERGONOMIC KEYBOARD

BACKGROUND OF THE INVENTION

This invention relates to computer control keyboards, in general, and more specifically, to a two-piece ergonomic computer keyboard.

Keyboards presently used for computers have several limitations. Because of the large number of additional keys required to operate computers, it is difficult for operators to move their fingers from the home key and place them on extra computer control keys without looking at the keyboard. For example, the function keys are located above the numerical keys and the hand must leave the home keys to reach them. In addition, the large number of additional keys have made computer keyboards large, bulky, and difficult to carrying in a briefcase with a portable computer.

Portable computer manufacturers attempts to make keyboards smaller have resulted in keys spaced too close together to be useful. Computer operator's hands cannot fit comfortably side by side on these small keyboards. It also causes wrist and arm fatigue to operate these cramped keyboards. The computer operator is also forced to learn to operate keys in a different arrangement on portable keyboards.

SUMMARY OF THE PRESENT INVENTION

The present invention utilizes a two-piece keyboard so that the right hand and left hand are not jammed uncomfortably together during operation of the computer. This puts the wrist of both hands at a comfortable angle that can be adjusted to each individual. In another embodiment, dual-function keys are employed so that a group of keys serve as both numeric and alphabetic keys. In yet another embodiment of the invention, a group of keys serve a dual purpose as alphabetic keys and as "function" keys. Using dual purpose keys eliminates the need for number keys and function keys found on standard keyboards. In yet another embodiment of the invention, "control" and "ALT" keys are placed above the alphabetic keys for ease of use, in the position previously occupied by number keys. Yet another embodiment of the invention has palm and wrist restraints so that left and right keyboards can be used without resting the keyboard on a flat surface.

DETAILED DESCRIPTION OF THE INVENTION

Figure 1:
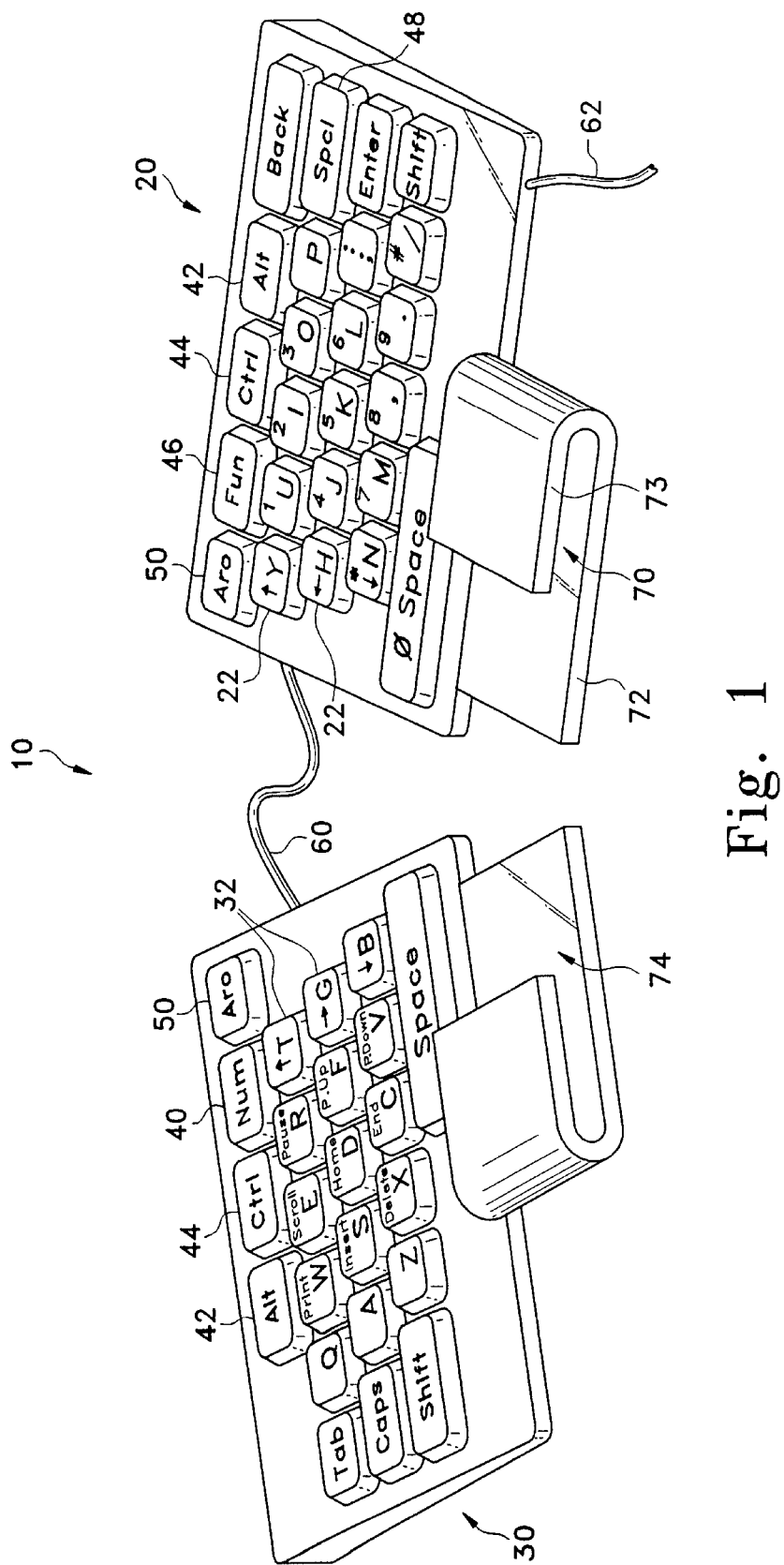
FIG. 1 shows a perspective view of a segmented keyboard according to the present invention.

FIG. 1 shows a computer keyboard referred to in general by numeral 10. Keyboard 10 is divided into a right half 20 and a left half 30. Right half 20 and left half 30 have right hand typing keys and left hand typing keys arranged in a standard manner in a system known as "QWERTY." Keys can also be arranged in other patterns such as "DOVRAK".

No numerical keys are present on either the right or left hand keyboards. Instead alphabetic keys serve a dual purpose as alphabetic keys and numeric keys. Keys U, I, O, J, K, L, M, "," and "." have been chosen as dual function, alpha-numeric keys in this embodiment although other keys may be used. The keys have been arranged in ascending order left to right, top to bottom, as found on a typical telephone touch pad. Thus, "U" is also "1", "I" is also "2", etc. The "N" key is also the asterisk (*), the "/" key is also a pound sign ("#") to further complete the typical telephone touch pad. The "space" bar is "0".

An alternative to using a telephone keyboard touch pad order would be to arrange the keys in the fashion of a calculator touch pad such as the separate numeric keypad found on many keyboards. This would involve using the same alphabetic keys described above, but arranging the keys in ascending numeric order left to right, bottom to top. Thus "U" would also be "7", "I" would also be "8", "0" would also be "9", "J" would also be "4", etc.

To convert the U, I, O, J, K, L, N, M, "." and "/" keys to numeric function, "Num Lock" key 40 is pressed. Numerical key 40 is placed on the left hand keyboard in this embodiment since the number keys are arranged on the right hand keyboard. Numeric key 40 may be located elsewhere on either keyboard.

Numerical keypad 40 can be arranged so that it must be depressed at the same time the selected alpha-numeric key is depressed in the same manner the shift key is used for capitals. Alternatively, the keyboard may be wired or programmed so that numerical key 40 is depressed to activate the numerical keys in a manner similar to the standard "CAP LOCK" feature.

The numerical key may be arranged on either keyboard or using any keys on either keyboard. For example, the numerical keypad can be arranged on the left hand keyboard if so desired. However, most people have become accustomed to using a computer keyboard with a separate numeric keypad near the right hand.

Since the number keys are no longer required, ALT key 42 and CTRL key 44 have been moved directly above the alphabetic keys. This is a more logical arrangement since the keys can be activated easily from the home keys without undue stretching or looking up to search for the keys. ALT key 42 and CTRL key 44 are duplicated on both keyboards for operation with either hand.

Functional key 46 is shown at the top of the right hand keyboard 20. In the preferred embodiment, functional keys 46 acts in manner similar to the Caps Lock key or the Num Lock key. Once depressed, it causes the alphanumeric keys to assume yet another function. This additional function is to operate as "function" keys, F1, F2, etc., found on a standard computer keyboard. For example, the U key would operate in a manner identical to the F1 key on a standard keyboard when Function key 46 is engaged. In a similar fashion, I, O, J, K, L, M, ",", "." and Space would serve as F1, F2, F3, F4, F5, F6, F7, F8, F9 and F10, respectively. These Function keys can be used in combination with Shift, ALT, and CTRL in a manner similar to present computer keyboards. When the function keys are no longer needed, Function key 46 can be depressed again so that the keyboard reverts back to normal alphabetic use.

Function key 46 may also be programmed so that it must be depressed simultaneously with the alphanumeric key selected. However, this design would be difficult to use since the Shift, Alt, or CTRL are often used in conjunction with function keys and this would involve depressing three keys simultaneously.

Function key 46 may be placed on either keyboard. Also, any of the keys on either keyboard can be used in combination with Function key 46 rather than the letters specified.

Utilizing U as both 1 and F1 has an advantage in that the operator can readily locate the position of these keys since they are used as both 1 and F1, etc.

In the preferred embodiment, when the Num Lock key 40 is depressed or the Function key 46 is depressed, use of any keys other than those which serve a numerical purpose or act as function keys will cause the computer to generate a high pitched tone. This reminds the operator that the Num Lock key is activated or the Function Lock key is activated. Different tones may be used for the Num Lock feature or the Function Lock feature.

An additional key has been placed on the right hand keyboard 20. This is the Special Function key 48. It is used in combination with left hand keys W, E, R, S, D, F, X, C, and V. When special function key 48 is activated, these keys serve as print screen, scroll lock, pause, insert, home, page up, delete, end, page down, respectively. These keys are often additional keys on a standard keyboard. A special tone may be used in combination with the Special Function key 48 so that use of any key other than W, E, R, S, D, F, X, C, or V when Special Function key 48 is depressed, generates a special tone to notify the operator that the Special Function key is still active. Special Function Key 48 may be located on either keyboard. Also, other keys than those indicated may be used for the special functions indicated. Special Function Key 48 may be activated in a manner similar to Num Lock and Cap Lock or it may be wired or programmed so that it must be pressed simultaneously with the dual function keys.

An Arrow keys 50 have been added. Activation of these keys may be in a fashion similar to the Num Lock, Caps Lock, Function Lock, or Special Function Lock as described above. Alternatively, it may be used by depressing the key at the same time the directional arrow keys are used. Keys T and Y serve as an up arrow when the arrow function key 50 is depressed. Keys B and N serve as down arrow keys when the arrow function key 50 is depressed. Key G serves as a right arrow and key H serves as a left arrow when arrow function key 50 is depressed. Other keys may be used as up, down, right, left arrow keys. However, the arrangement as shown in the preferred embodiment is a logical order in that the operator would tend to point in the directions indicated when using the fingers needed to operate the keys specified. This arrangement eliminates the need for separate arrow keys which are found on many standard keyboards.

Left and right keyboards may be connected electrically by means of a cord 60. Other means of connecting keyboard 60 may be wireless means such as infrared signals, radio signals, microwave signals, etc. Connector 62 connects both keyboards to a personal computer in a normal fashion. This connection may also be made by means of a wireless connection. These types of connection are known in the art and are used to connect portable computers to desk top units.

Right hand rest 70 provides a place to rest the right hand of the operator when using the right hand keyboard 20. Rest 20 may be adjusted to the left or right to fit individual operators. The spacing between lower half 72 and upper half 73 may also be adjusted to hold the wrist and palm of the user snugly so that right hand keyboard need not rest on a hard surface. In a similar fashion, left hand rest 74 is attached to left hand keyboard 30. It functions in a similar fashion to that described for right hand rest 70. Right hand and left hand keyboards with hand rests as described may be used with the operator's hands and keyboards in her pocket. This would make operation when standing much easier and more discrete.

Figure 2:
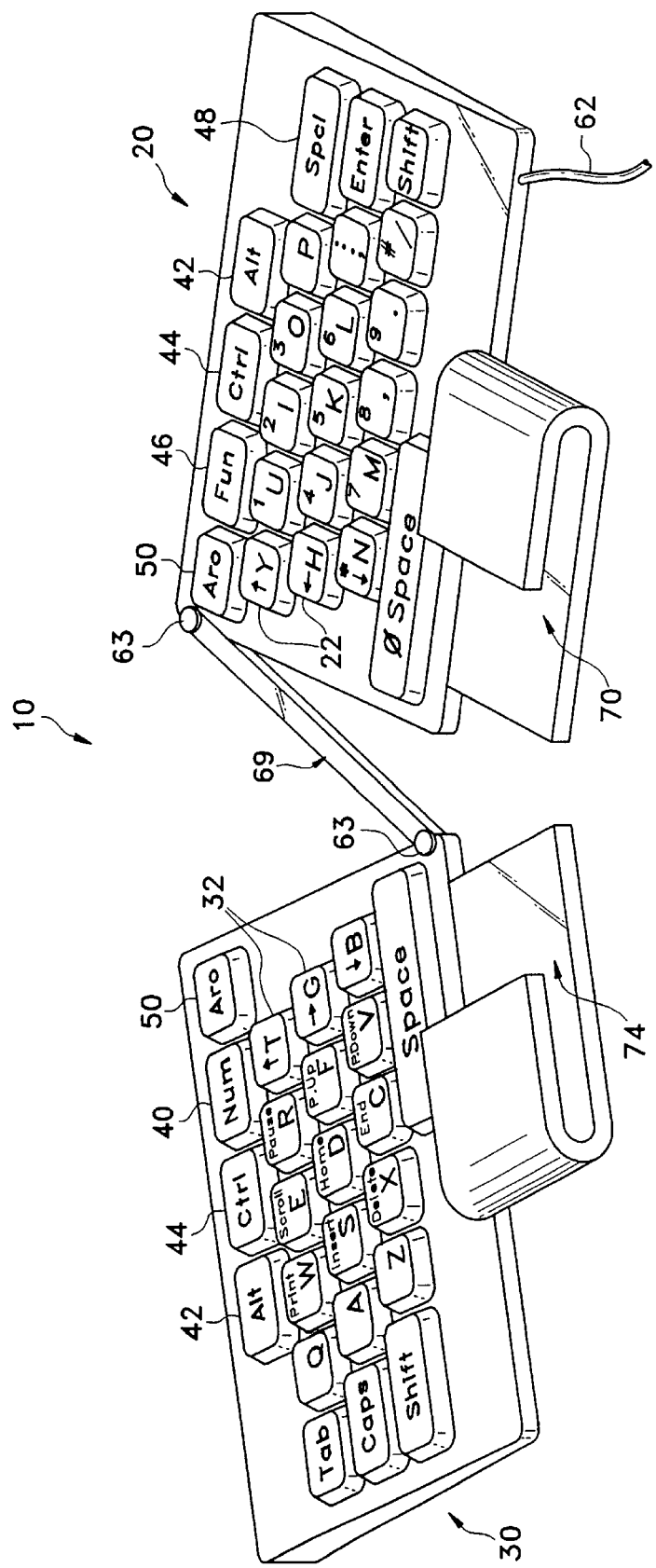
FIG. 2 shows a perspective of a puzzle fit two-piece keyboard according to the present invention.

FIG. 2 is similar to the invention shown in FIG. 1 except a rigid piece 69 is used to connect the right hand 20 and left hand keyboard 30. Rigid connector 69 has pivot points 63 at the points at which it is attached to left hand keyboard 30 and right hand keyboard 20. A two-piece connector may be used with an additional pivot point at the center of connector 64. In this embodiment, the keyboards may be folded together and operated as a standard one-piece keyboard.

When not in use, right half keyboard 20 and left half keyboard 30 may be folded together back-to-back. For example, if the embodiment shown in FIG. 2 were used, one or both of the joints 63 may be a universal type joint so that it pivots in more than one direction. Thus, after moving right hand keyboard 20 adjacent left hand keyboard 30, the keyboards may be folded so their keys touch. Alternatively, they may be folded so the backs touch. The embodiment as shown in FIG. 1 may be folded in a similar manner.

Figure 3:
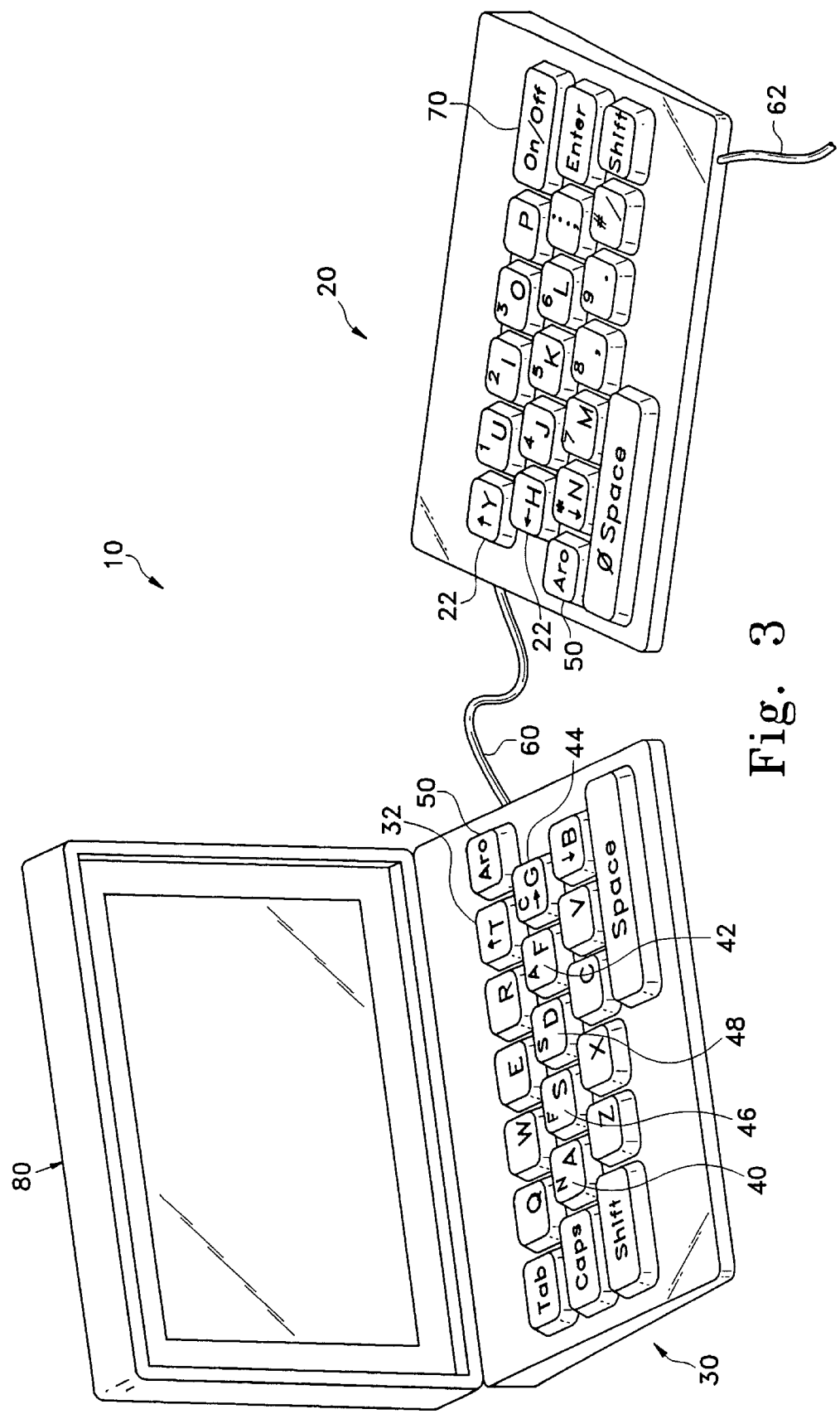
FIG. 3 shows a two-piece keyboard computer combination according to the present invention.

FIG. 3 shows a folding screen 80 attached to left hand keyboard 30. In this embodiment, a folding screen which is well known in the computer art is used. When the computer 10 is not in use, screen 80 may be folded down over keyboard 30. Alternately, the screen may be folded to the back of the keyboard. In addition, right hand keyboard 20 may be folded back to back with left hand keyboard 30 to provide a compact easily portable unit.

The computer itself may be built into the right hand keyboard 20. The computer may include standard features such as flash memory, microprocessor, floppy disk reader, hard disk reader and other standard computer features or combinations of these.

The screen shown in FIG. 3 may be on either the right hand or left hand keyboard. The built in computer may be contained in either the right hand or left hand keyboard, on the opposite keyboard from the computer screen or in the same keyboard as the computer screen. Additionally, memory devices such as flash memory, hard disk, floppy disk reader or similar memory devices can be accommodated in either the same keyboard as the screen or the same keyboard as the computer or separate from either.

In yet another embodiment, left hand computer keyboard may use the home keys A, S, D, F and G to serve as Numerical, Function, Special function, ALT and CTRL, respectfully. This further reduces the size of the keyboard by eliminating separate keys for these operations. To activate dual purpose keys A, S, D, F and G, On-Off Key 90 is used. This may be set up in a fashion similar to the Caps Lock key or in an alternate embodiment, may be pressed simultaneously while pressing the A, S, D, F and G keys. This embodiment further reduces the size of the keyboard by eliminating additional keys.

I claim:

1. A segmented computer keyboard comprising:
    a right hand keyboard with a wrist restraint;
    a left hand keyboard with a wrist restraint; and
    wherein said left and right keyboards may be operated without resting the keyboard on a hard surface.

\* \* \* \* \*